No. 828,030. PATENTED AUG. 7, 1906.
J. G. JOHNSON.
ROTARY VALVE FOR STEAM ENGINES.
APPLICATION FILED AUG. 18, 1905.
2 SHEETS—SHEET 1.
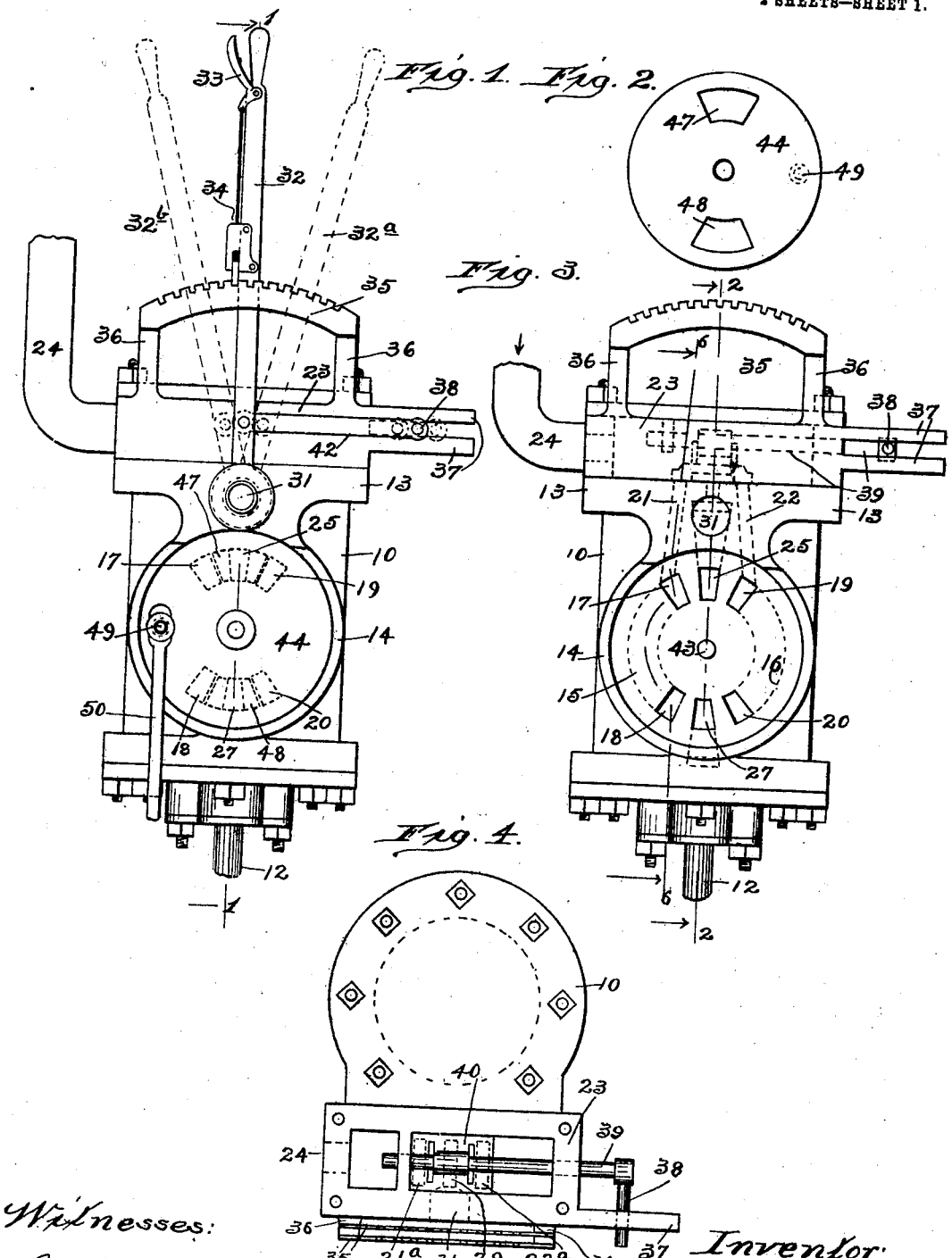
Witnesses:
Chas. E. Gorton
N. A. Nyman
Inventor:
John G. Johnson
By Chas. C. Tillman
Atty.

No. 828,030. PATENTED AUG. 7, 1906.
J. G. JOHNSON.
ROTARY VALVE FOR STEAM ENGINES.
APPLICATION FILED AUG. 18, 1905.

2 SHEETS—SHEET 2.

Witnesses:
Chas. E. Gorton.
M. A. Nyman.

Inventor:
John G. Johnson.
By Chas. C. Tillman
Atty.

UNITED STATES PATENT OFFICE.

JOHN G. JOHNSON, OF TITUSVILLE, PENNSYLVANIA, ASSIGNOR OF ONE-FOURTH TO KARL OSCAR HEDSTROM, OF AXTELL, NEBRASKA.

ROTARY VALVE FOR STEAM-ENGINES.

No. 828,030.

Specification of Letters Patent.

Patented Aug. 7, 1906.

Application filed August 18, 1905. Serial No. 274,660.

*To all whom it may concern:*

Be it known that I, JOHN G. JOHNSON, a subject of the King of Sweden and Norway, residing at Titusville, in the county of Crawford and State of Pennsylvania, have invented certain new and useful Improvements in Rotary Valves for Steam-Engines, of which the following is a specification.

This invention relates to improvements in a rotary valve for steam-engines; and it consists in certain peculiarities of the construction, novel arrangement, and operation of the various parts thereof, as will be hereinafter more fully set forth and specifically claimed.

The principal object of the invention is to provide a rotary valve to be used with various types of steam-engines, which shall be simple and inexpensive in construction, strong, durable, and efficient in operation, and which shall be so made as to render it less liable to get out of order than such devices as have been heretofore constructed.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 5:
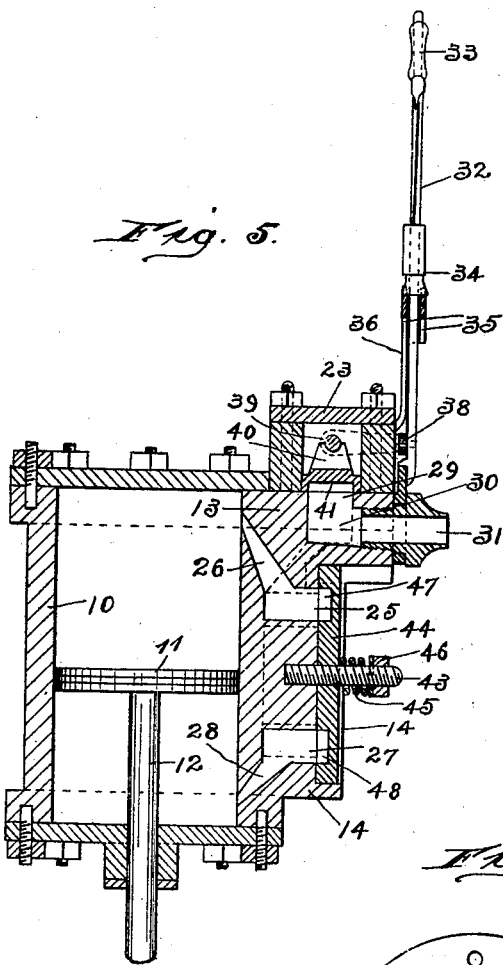
Figure 6:
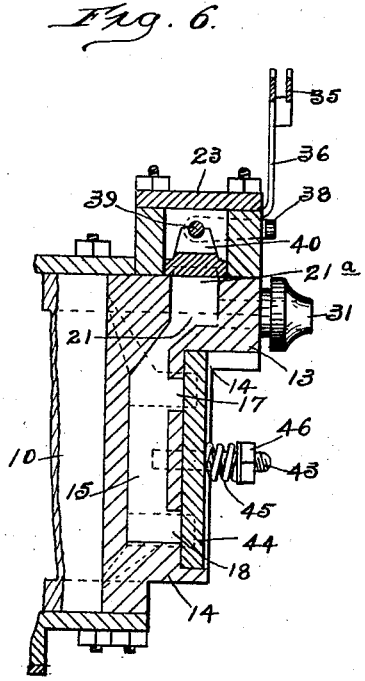
Figure 7:
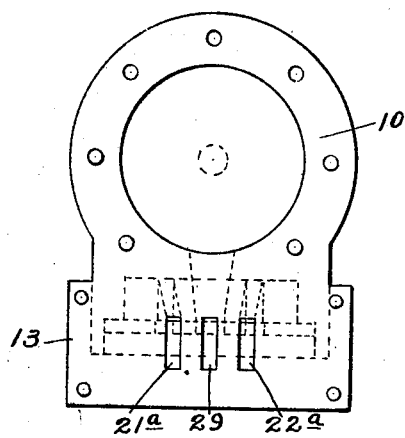

Figure 1 is a face view in elevation of the cylinder of an engine, showing my invention applied thereto and illustrating by dotted lines the positions to which the controlling-lever may be moved in the operation of reversing the engine. Fig. 2 is a detached inner face view of the oscillating valve. Fig. 3 is a face view of the cylinder of the engine with the controlling-lever and oscillating valve removed. Fig. 4 is a plan view, showing the top plate of the steam-chest and the controlling-lever omitted. Fig. 5 is a vertical central sectional view taken on lines 1 1 of Fig. 1 and 2 2 of Fig. 3 looking in the direction indicated by the arrows. Fig. 6 is a vertical sectional view taken on line 6 6 of Fig. 3 looking in the direction indicated by the arrows, and Fig. 7 is a plan view of the cylinder with the top head-plate and the steam-chest thereof removed.

Like numerals of reference refer to corresponding parts throughout the different views of the drawings.

The reference-numeral 10 designates the engine-cylinder, in which is located a piston 11, having a piston-rod 12 connected at one of its ends thereto, the other end of which may be connected to a suitable part. (Not shown.) One end of the cylinder 10 is provided on its exterior with a transverse enlargement 13, the upper surface of which is flat and substantially rectangular in shape and is employed to form a support for the steam-chest and seat for the slide-valve therein. The wall of the cylinder directly beneath the enlargement 13 or in alinement with said enlargement is provided with a boss or enlargement 14, the face of which is circular and flat to form a seat for the oscillating valve, as will be presently explained. The boss or enlargement 14 is provided with two steam-chambers 15 and 16, located side by side when the engine-cylinder is in an upright position, as shown, and for convenience of description the parts will be referred to as if they were applied to an upright engine; but it will be apparent that the cylinder may be located in a horizontal position or otherwise. The chamber 15 has at its upper end a port 17 and at its lower end a port 18, while the chamber 16 has at its upper end a port 19 and at its lower end a port 20, which ports are located in the face of the enlargement 14 or seat for the oscillating valve. Leading from the upper ends of the chambers 15 and 16 are channels 21 and 22, respectively, which communicate through ports 21$^a$ and 22$^a$, respectively, in the seat 13 of the sliding valve with the steam-chest or slide-valve casing 23, which may be of the ordinary or any preferred construction, but is preferably rectangular in shape and has communicating with one of its ends an inlet or induction pipe 24, through which the steam is passed to the engine from the boiler. Located between the ports 17 and 19 in the valve-seat 14 is a port 25, from which a channel 26 leads into the upper portion of the cylinder. Located between the ports 18 and 20 in the valve-seat 14 is a port 27, which has communication through a channel 28 with the lower portion of the cylinder.

Located between the ports 21$^a$ and 22$^a$ of the slide-valve seat 13 is a port 29, which communicates through a channel 30 with the exhaust-pipe 31, which is secured in a suitable opening in the face of the enlargement 13 or seat for the slide-valve. Fulcrumed at its lower end on the exhaust-pipe 31 is a controlling-lever 32, which is provided with a grip-lever 33 and rod 34 to engage the teeth of a segmental rack 35, which is horizontally mounted on uprights 36, secured to the front portion of the steam-chest. Extending horizontally from the face or front portion of the steam-chest and at the opposite end thereof from the steam-supply pipe 24 is a slotted arm 37 for the reception and operation of a rod 38, which is secured on one end of a rod 39, which is movably and longitudinally located in the steam-chest and is connected to the slide-valve 40, seated on the valve-seat 13, and which valve is provided on its lower surface with a cavity 41. Connected at one of its ends to the arm 38 is a link 42, the other end of which is pivotally connected to the controlling-lever 32 at a suitable point above its fulcrum.

The enlargement or seat 14 for the oscillating valve is provided at its center with a screw-threaded stem 43, on which is loosely mounted the oscillating valve 44, which is held in contact with its seat 14 by means of a spring 45, surrounding said stem, and a nut 46 on the outer end of the stem. The inner surface of the valve 44 is provided with recesses 47 and 48, located diametrically opposite each other, and are of sufficient size to unite when the valve is turned to the proper position two of the ports in the upper and lower groups thereof in the seat 14 for said valve, which is provided on its outer surface with a wrist-pin 49, to which is connected one end of an eccentric-rod 50, the other end of which is connected to the crank-shaft (not shown) of the engine.

From the foregoing and by reference to the drawings it will be seen and clearly understood that when the controlling-lever 32 is in a vertical position, as shown in Figs. 1 and 5, the slide-valve 40 will close all of the ports in the valve-seat 13, thus shutting off the flow of steam to the cylinder and preventing the operation of the engine. By moving the lever 32 to the position shown by dotted lines at 32$^a$ in Fig. 1 of the drawings it is apparent that the slide-valve 40 will be moved so as to open the port 21$^a$ and close the ports 22$^a$ and 29 in the seat 13, thus permitting steam to pass through the channel 21 into the chamber 15, when in the operation of the oscillating valve 44 the recesses 47 and 48 thereof will afford by-passes alternately for the ports 17 and 25 in the upper part of the valve-seat 14 and the ports 18 and 27 in the lower part thereof, thus permitting the steam to pass through the channels 26 and 28 alternately, so as to drive the engine in one direction. By moving the lever 32 from the position shown by dotted lines at 32$^a$ to that shown by dotted lines at 32$^b$ in Fig. 1 the slide-valve 40 will be moved so as to cover the ports 21$^a$ and 29 and to open the port 22$^a$ in its seat, thus permitting the steam to pass through the channel 22 into the chamber 16 when in the operation of the oscillating valve 44 its recesses 47 and 48 will afford by-passes alternately for the ports 19 and 25 in the upper portion of the valve-seat 14 and for the ports 20 and 27 in the lower portion thereof, thus permitting the steam to pass alternately through the channels 26 and 28 into the cylinder, thereby driving the engine in the opposite direction.

Having thus fully described my invention, what I claim as new, and desire to secure by Letters Patent, is—

The combination with an engine-cylinder having a pair of steam-chambers each provided with an inlet-channel, of a steam-chest located at one end of the cylinder and having an inlet for steam, a seat for an oscillating valve located outwardly from said steam-chambers and provided with ports communicating with each end of each of said chambers, said oscillating valve-seat also having intermediate ports in communication with the cylinder near its ends, an oscillating valve mounted on the seat therefor and provided on its inner face with recesses, and means to oscillate said valve, substantially as described.

JOHN G. JOHNSON.

Witnesses:
GEO. A. CHASE,
LARS J. CEDERQUIST.